(12) United States Patent
Takeda

(10) Patent No.: US 6,624,421 B1
(45) Date of Patent: Sep. 23, 2003

(54) RADIATION LIGHT TRANSDUCER, RADIATION IMAGE PICKUP DEVICE, RADIATION IMAGE PICKUP SYSTEM, AND PROCESS FOR PRODUCING RADIATION LIGHT TRANSDUCER

(75) Inventor: Shinichi Takeda, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/605,753

(22) Filed: Jun. 28, 2000

(30) Foreign Application Priority Data

Jun. 30, 1999 (JP) ............................................ 11-185657

(51) Int. Cl.[7] ................................................. G01T 1/20
(52) U.S. Cl. ............................. 250/363.01; 250/370.11
(58) Field of Search ........................ 250/370.11, 363.01

(56) References Cited

U.S. PATENT DOCUMENTS 3,855,035 A  * 12/1974 Bates et al. .................. 156/276
5,153,438 A  * 10/1992 Kingsley et al. ......... 250/370.09
5,801,385 A  *  9/1998 Endo et al. ............ 250/370.11
6,149,748 A  * 11/2000 Boedinger et al. ....... 156/89.11
6,384,393 B2    5/2002 Takami et al. ........... 250/208.1

FOREIGN PATENT DOCUMENTS

EP          0 872 896 A1    10/1998
JP          10-341013 A     12/1998

* cited by examiner

*Primary Examiner*—Constantine Hannaher
(74) *Attorney, Agent, or Firm*—Fitzpatrick, Cella, Harper & Scinto

(57) ABSTRACT

A radiation light transducer is provided which comprises a substratum having a water-impermeable member which transmits radiation projected from outside, and a wavelength transducing means which transduces the radiation transmitted through the substratum to light, wherein the substratum has a cavity to seal the edge face of the transducing means. Thereby, penetration of moisture from X-ray visible-light transducing substratum into the element formation region of X-ray visible-light transducer is prevented

23 Claims, 11 Drawing Sheets

RADIATION LIGHT TRANSDUCER, RADIATION IMAGE PICKUP DEVICE, RADIATION IMAGE PICKUP SYSTEM, AND PROCESS FOR PRODUCING RADIATION LIGHT TRANSDUCER

BACKGROUND OF THE INVENTION

1. Field of the Invention

The present invention relates to a radiation light transducer for transducing a radiation ray like an X-ray Into light, a radiation image pickup device employing the transducer, a radiation image pickup system therefor, and a process for producing the radiation light transducer. In particular, the present invention relates to a radiation light transducer having a water-impermeable member capable of transmitting a radiation ray projected from the outside, a radiation image pickup device employing the transducer, a radiation image pickup system, and a process for producing the radiation light transducer.

2. Related Background Art

A roentgen examination apparatus employed in medical diagnosis should detect precisely an abnormal portion of a patient. Usual roentgen examination apparatuses convert the X-ray transmitted through a patient body or another examination subject into visible light or the like by means of a fluorescent screen, and a film in contact with the screen is exposed to the light. Although this conventional roentogen examination is sufficient in image resolution in a practical level, it has problems such that a long time is necessary from measurement to diagnosis, and the skill and extrasensory perception is required of the rentogenograph specialist for the location of the measurement region.

In recent years, a large-area sensor typified by amorphous silicon are developed to be reliable. By utilizing the merit of the amorphous silicon and the ease of enlarging the area thereof, the amorphous silicon are being developed for real-time roentogen examination with sufficient image contrast to raise the efficiency of abnormality diagnosis of the patient.

Generally, in detection of an X-ray image by a photoelectric transducer, an X-ray visible light transducer is necessary for transducing the radiation, namely the X-ray, to visible light. In the medical field, the transducer should have a large area suitable for roentogen examination of a thorax. A conventional transducer is constructed from a readily available fluorescent screen (a plate containing powdery phosphor) for film exposure with a large-area two-dimensional photoelectric transducer.

The radiation image pickup device which has a two-dimensional photoelectric transducer and a fluorescent screen bonded thereon is explained below.

FIG. 1A is a schematic plan view of a structure of a radiation image pickup device. FIG. 1B is a schematic sectional view of the device taken along line 1B—1B in FIG. 1A.

In FIG. 1A and FIG. 1B, photoelectric transducer 100 comprises base plate 101 made of glass or the like, element formation region 110 having a photoelectric transducer element or the like formed on base plate 101, and an electroconductive layer of aluminum or the like for wiring and connection electrode for electric connection with an external power source not shown in the drawing. Fluorescent screen 200, which is an X-ray visible-light transducer for wavelength conversion, comprises base board 201 made of PET (polyethylene terephthalate) or the like, and X-ray visible-light transducing layer 210 containing a phosphor particles for transducing the X-ray transmitted through base board 201 to visible light.

Photoelectric transducer 100 and X-ray visible-light transducer 200 are prepared respectively by separate processes. They are bonded together by an adhesive not shown in the drawing and fixed to complete the radiation image pickup device 1.

FIG. 2 is an enlarged sectional view of portion 2 indicated by a closed broken line in FIG. 15. This example of the photoelectric transducer having a two-dimensional light-receiving region has a base plate 101 made of glass or the like having a large area, and has therein a picture element input portion comprising photoelectric transducing element portion 120 employing amorphous silicon, and thin film transistor element portion 130, extending two-dimensionally. (Hereinafter, the thin film transistor is referred to as "TFT".) The X-ray visible-light transducer employs a large-area fluorescent screen containing powdery phosphor.

In FIG. 2, photoelectric transducer 100 comprises, on base plate 101 made of glass or the like, photoelectric transducing element portion 120; TFT element portion 130, and element formation region 110 having wiring not shown in the drawing for driving the above elements, wiring for image signal readout, connection terminals for connection with external electric circuit, and so forth.

The respective layers constituting photoelectric transducing element portion 120 and TFT element portion 130 are constituted of lower electroconductive layer 102 composed of Cr, insulation layer 103 composed of hydrogenated noncrystalline silicon nitride layer, semiconductor layer 104 composed of an intrinsic hydrogenated noncrystalline silicon layer, n$^+$ layer 105 composed of n$^+$ type hydrogenated amorphous silicon, upper electroconductive layer 106 composed of aluminum, and semiconductor protection layer 107 composed of hydrogenated noncrystalline silicon nitride ($\alpha$-SiN:H) layer. These layers are formed by deposition by CVD, sputtering, vapor deposition or the like process, patterning, and are electrically tested for function confirmation.

The above materials for constituting the layers of photoelectric transducing element portion 120 and TFT element portion 130 are shown as examples only, and are not limited thereto.

X-ray visible-light transducer 200 is produced by forming X-ray visible-light transducing layer 210 by blending powdery phosphor particles 202 with binder 203, applying the blended matter on base board 201 made of PET or a like material, curing the binder to allow phosphor particles 202 to adhere and to fix on base board 201.

The obtained photoelectric transducer 100 and X-ray visible-light transducer 200 are bonded by adhesive 300 such as a silicone adhesive and an epoxy adhesive, and the adhesive is cured to prepare a radiation image pickup device.

This radiation image pickup device transduces the X-ray introduced from the side of base board 201 to visible light by X-ray visible-light transducing layer 210. This visible light is introduced to element formation region 110 on base plate 101 of photoelectric transducer 100 and is transduced to electric signals. This electric signals are read out by TFT element portion 130 on base plate 101 of photoelectric transducer 100 and external drive circuit (not shown in the drawing) to obtain electric signals for two-dimensional X-ray image.

However, base board 201 of X-ray visible-light transducer 200 is made of a moisture-permeable PET (polyethylene terephthalate), and binder 203 constituting the X-ray visible-light transducing layer 210 is a permeable resin. Base board 201 is fixed to element formation region 110 of photoelectric transducer 100 by adhesive 300 with interposition of X-ray visible-light transducing layer 210.

Therefore, when the radiation image pickup device is kept at a high humidity, base board 201 absorbs moisture, and the moisture is liable to penetrate through X-ray visible-light transducing layer 210 into element formation region 110. The moisture in element formation region 110 may cause deterioration and variation of characteristics of the photoelectric transducing element or other parts, or may cause disconnection of wiring by corrosion, thereby causing problems in long-term environmental stability of the photoelectric transducer.

Further, X-ray visible-light transducer 200 employs a fluorescent screen prepared by cutting a large fluorescent plate into pieces of a desired size. Even if the external face of base board 201 is covered with a metal such as aluminum by bonding with an adhesive, moisture can penetrate into base board 201 from its edge side. Therefore, the penetration of moisture into element formation region 110 cannot readily be prevented completely.

In X-ray visible-light transducing layer 210, phosphor particles are not packed at a sufficiently high packing density owing to the presence of binder resin 203, thereby efficiency of transducing the X-ray to visible light being lower. The increase of the packing density of phosphor particles 202 makes the entire of X-ray visible-light transducing layer 210 brittle, resulting in difficulty in handling.

Increase of the thickness of X-ray visible-light transducing layer 210 for improving the X-ray visible light transduction efficiency will cause scatter or absorption of the transduced light by binder 203, phosphor particles, and their interface. Thereby, the efficiency of the visible light generated by the transduction to reach photoelectric transducing element region 120 may be lowered, and the increase of the scattered light will lower resolution of the image. In particular, in use of the two-dimensional radiation image pickup device for human diagnosis, the quantity of the X-ray from radiation source should be decreased to minimize the X-ray exposure dose to a human body. The drop of the resolution and sensitivity by scattering is the problem to be solved. Therefore, the thickness of X-ray visible-light transducing layer 210 is usually set at about 150 μm.

Another X-ray visible-light transducer is disclosed In which the phosphor is packed at a packing ratio of 100% by using a fluorescent material like CsI, and forming crystalline matter by vapor deposition or a like process without using binder 203. However, this type of transducer deteriorates significantly in the characteristics (X-ray visible-light transducing efficiency), and moisture will readily penetrate through the surface of base board 201, making difficult the maintenance of the characteristics throughout the period of use.

SUMMARY OF THE INVENTION

An object of the present invention is to provide an X-ray visible-light transducer which does not allow moisture to penetrate into an element formation region of a photoelectric transducer through a substrate such as an X-ray visible-light transducing substratum, without increasing the steps of the transducer production.

Another object of the present invention is to provide a radiation light transducer (e.g., X-ray visible-light transducer) which can maintain light transmission efficiency and resolution without scattering or absorption of light by a binder, powder particles, or the interface thereof even with an increased thickness of the transducing region.

A further object of the present invention is to provide a radiation image pickup device employing the above radiation light transducer, a radiation image pickup system, and a process for producing the radiation light transducer.

According to an aspect of the present invention, there is provided a radiation light transducer comprising a substrate comprised of a water-impermeable member which transmits radiation projected from outside, and a wavelength transducing means which transduces the radiation transmitted through the substrate to light, wherein the substrate has a cavity to cover the edge face of the wavelength transducing means.

According to another aspect of the present invention, there is provided a radiation light transducer comprising a substrate comprised of a water-impermeable member which transmits radiation and having a cavity on one face thereof, a wavelength transducing means provided in the cavity of the substrate for transducing the wavelength of the radiation, the wavelength transducing means being in contact, at one face and adjacent edge face thereof, with the inside face of the cavity of the substrate.

According to a further aspect of the present invention, there is provided a radiation image pickup device comprising the above radiation light transducer, and a photoelectric transducer for transducing the above transduced light further to electric signals.

According to a further aspect of the present invention, there is provided a radiation image pickup system comprising the aforementioned radiation image pickup device, an irradiating means for projecting radiation to the radiation image pickup device, which irradiating means consists of a radiation source, a signal processing circuit for processing the signals from the photoelectric transducer, a storing means for storing signals from the signal processing circuit, a displaying means for displaying the signals from the signal processing circuit, and a transmission-treatment means for transmitting the signals from the signal processing circuit.

According to a further aspect of the present invention, there is provided a process for producing the radiation light transducer comprising the steps of forming a hollow on a substrate comprised of a water-nonpermeable member capable of transmitting radiation projected from the outside, and forming a wavelength transducing means for transducing the radiation transmitted through the substrate to light.

According to a further aspect of the present invention, there is a process for producing the radiation light transducer comprising the steps of forming a cavity on a substrate capable of transmitting radiation, and forming on the cavity a wavelength transducing means for transducing the wavelength of the radiation.

According to the present invention, the lateral edge face of the wavelength transducing means for transducing the radiation to light is covered with the substrate, whereby penetration of moisture into the photoelectric transducer can be prevented and the wavelength can be transduced stably for a long term.

DETAILED DESCRIPTION OF THE PREFERRED EMBODIMENTS

The embodiments of the present invention are described below by reference to drawings.

Embodiment 1

Figure 1A:
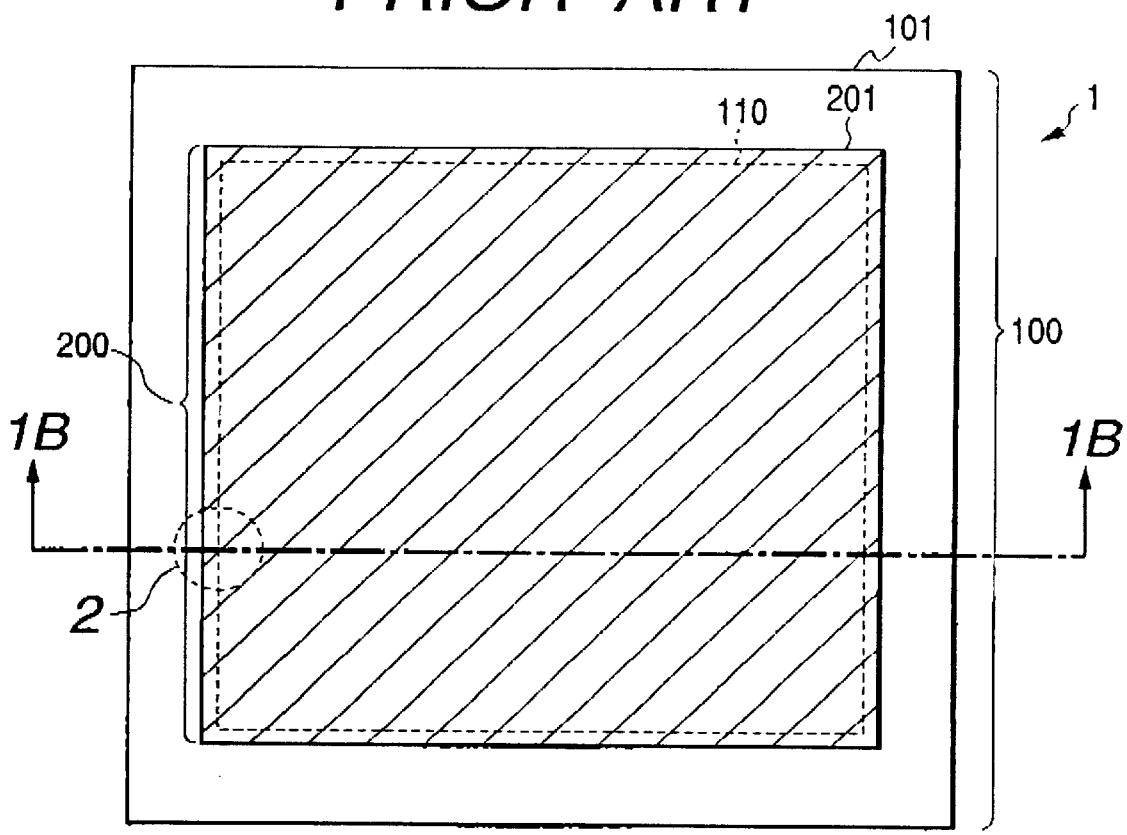
FIG. 1A, FIG. 3A, and FIG. 7A are respectively a schematic plan view of a radiation image pickup device.
Figure 1B:
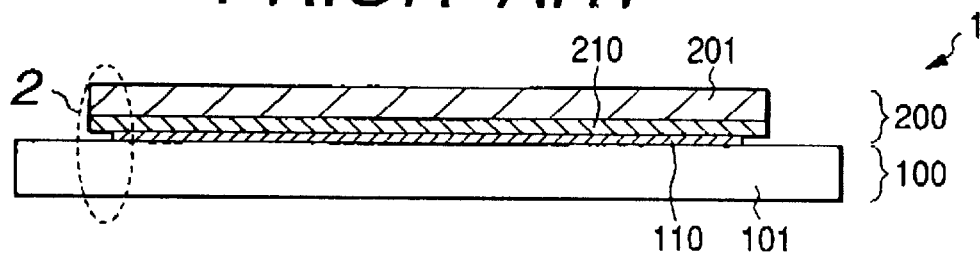
FIG. 1B, FIG. 3B, and FIG. 7B are respectively a schematic sectional view of the radiation image pickup device.
Figure 2:
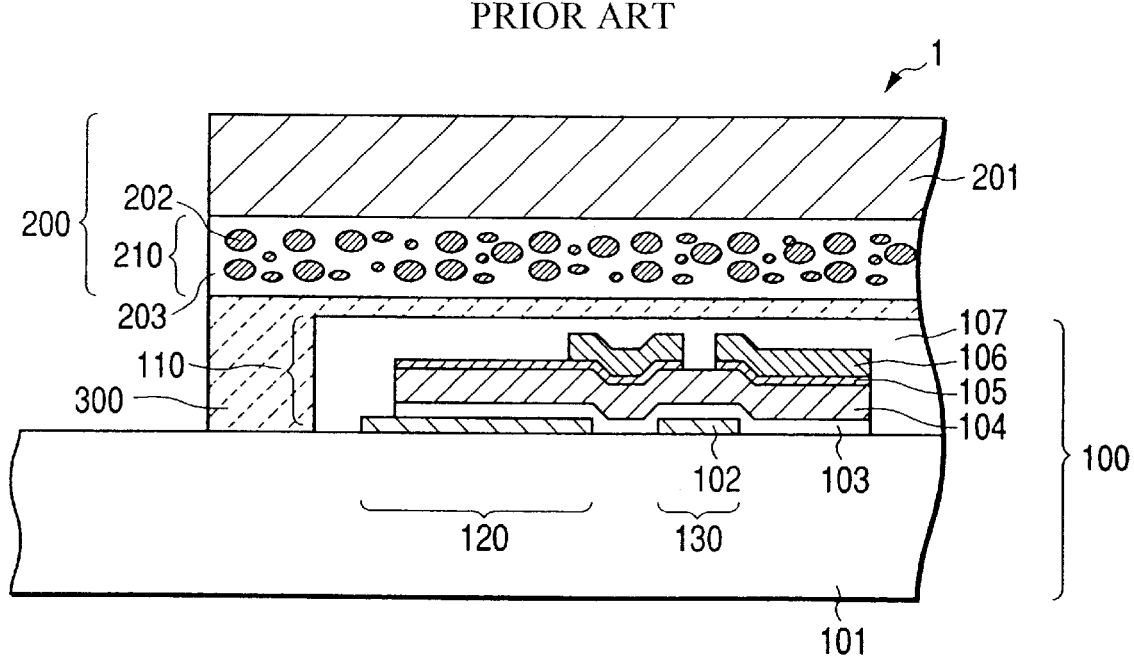
FIG. 2, FIG. 4, and FIG. 8 are respectively a schematic partial enlarged sectional view of the radiation image pickup device.

FIGS. 3A, 3B, 4 to 6 are drawings for explaining a radiation image pickup device of this embodiment. The same reference numbers and symbols as in FIGS. 1A, 1B, and 2 are used to indicate the corresponding members.

Figure 3A:
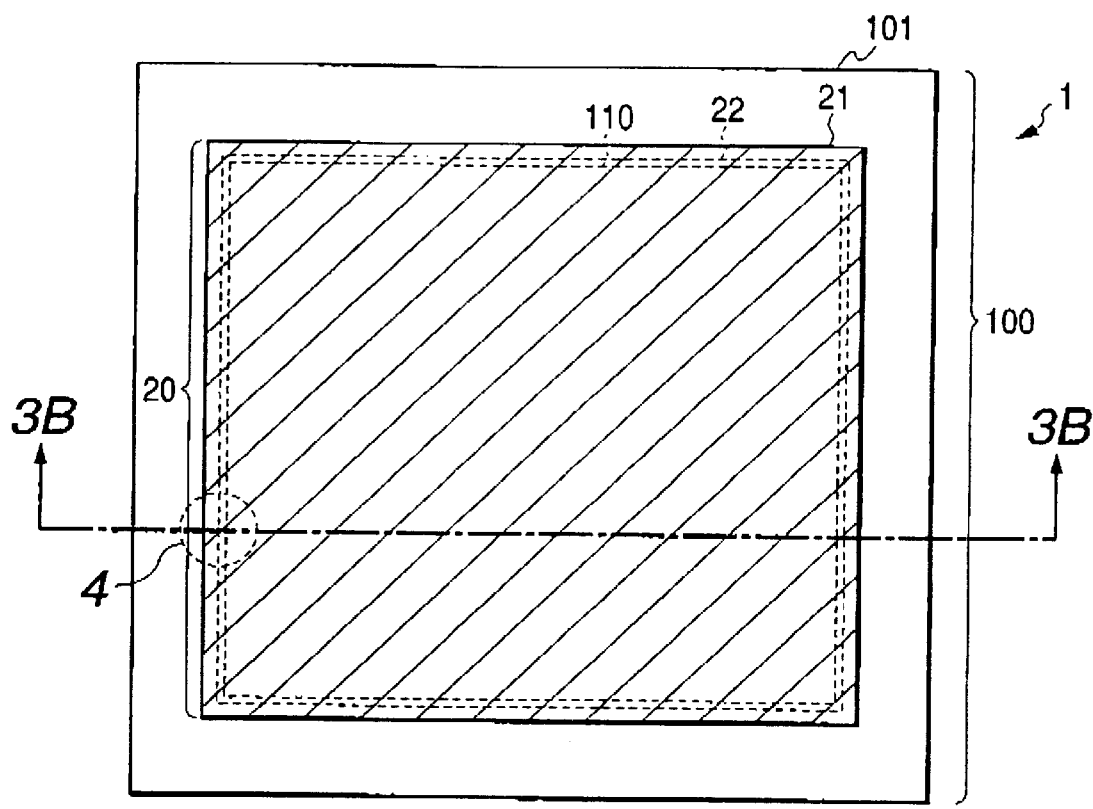
Figure 3B:
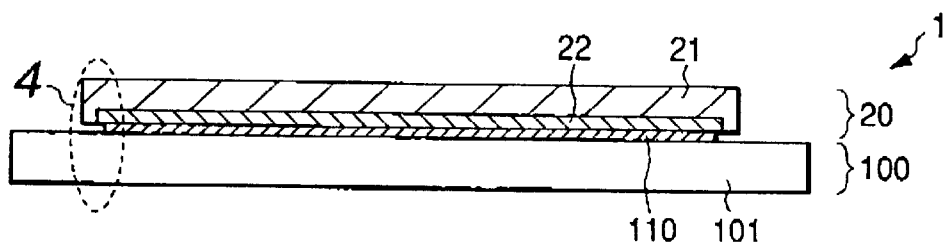

FIG. 3A is a schematic entire plan view of the radiation image pickup device of this embodiment. FIG. 3B is a schematic sectional view of the device taken along line 3B—3B in FIG. 3A. In FIGS. 3A and 3B, the radiation light transducer 20 is an X-ray visible-light transducer, comprising an X-ray visible-light transducing aluminum substratum 21 having a cavity, and X-ray visible-light transducing layer 22 which is formed from CsI in the cavity and transduces the introduced radiation (X-ray in this embodiment) to light of wavelength detectable by a photoelectric transducing element.

Figure 4:
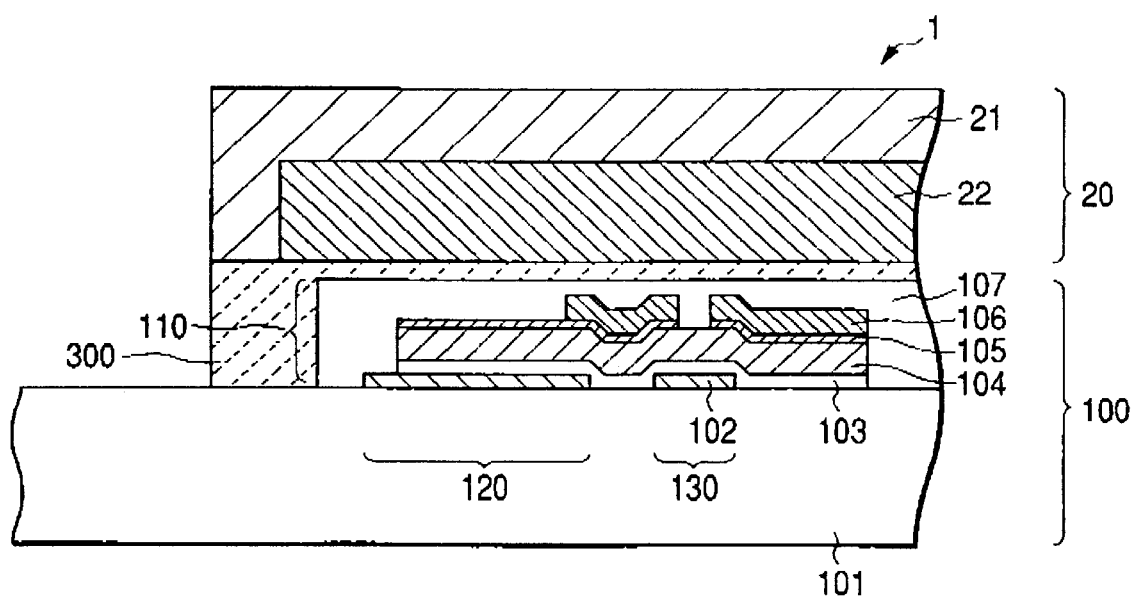

FIG. 4 is a schematic enlarged sectional view of region 4 indicated by a closed broken line in FIG. 3B In FIG. 4, X-ray visible-light transducer 20 is constructed by use of adhesive 300. As shown in FIGS. 3A, 3B, and 4, the X-ray introduction face and the edge face of X-ray visible-light transducing layer 22 are placed in the aforementioned cavity to be covered by X-ray visible-light transducing substratum 21.

Figure 5A:
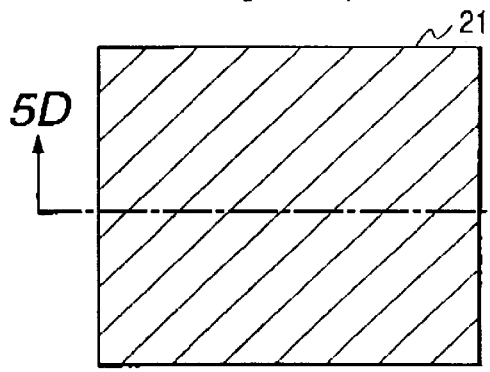
FIG. 5A, FIG. 5B, FIG. 5C, FIG. 9A, FIG. 9B, and FIG. 9C are respectively a schematic plan view for explaining a process for producing a radiation light transducer of the present invention.
Figure 5D:
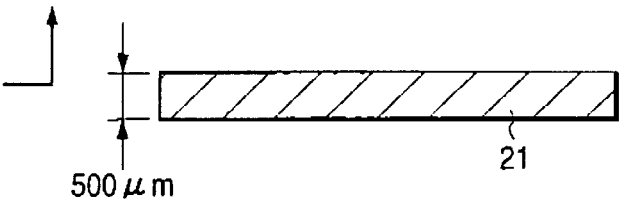
FIG. 5D, FIG. 5E, FIG. 5F, FIG. 9D, FIG. 9E, and FIG. 9F are respectively a schematic sectional view for explaining the process for producing a radiation light transducer of the present invention.
Figure 5B:
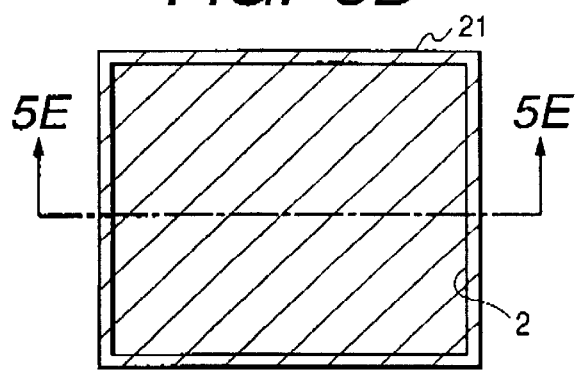
Figure 5E:
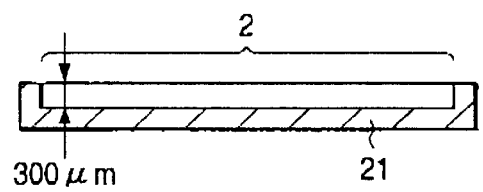
Figure 5C:
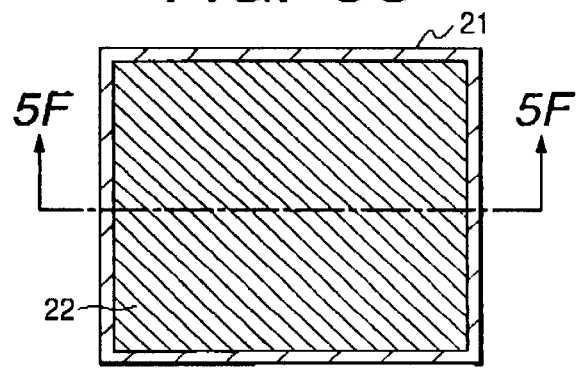
Figure 5F:
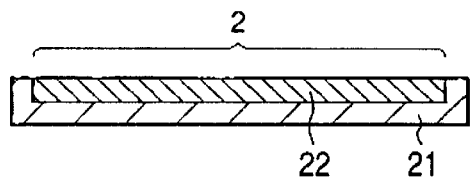

FIGS. 5A to 5F are schematic drawings for explaining an example of the process for producing the X-ray visible-light transducer of this embodiment. FIGS. 5A to 5C are schematic plan views of an X-ray visible-light transducer in the production steps. FIGS. 5D to 5F are schematic sectional views respectively taken along lines 5D—5D, 5E—5E, and 5F—5F in FIGS. 5A, 5B and 5C. In FIGS. 5A and 5F, the same reference numbers and symbols as in FIGS. 3A, 3B, and 4 are used to indicate the corresponding members. In FIGS. 5A to 5D, X-ray visible-light transducer substratum 21 is, for example, an aluminum plate of 500 $\mu$m thick. On this aluminum plate, cavity 2 is formed by press working or cutting as shown in FIGS. 5B and 5E. The distance between the bottom face of the cavity 2 and the surface of aluminum plate, namely the depth of the cavity, is 300 $\mu$m in this embodiment.

Subsequently, as snown in FIGS. 5C and 5F, columnar crystalline CsI as X-ray visible-light transducing layer 22 is formed in the cavity 2 of the X-ray visible-light transducer substratum 21 by vapor deposition by means of a vacuum vapor deposition apparatus (FIG. 6) described below.

Figure 6:
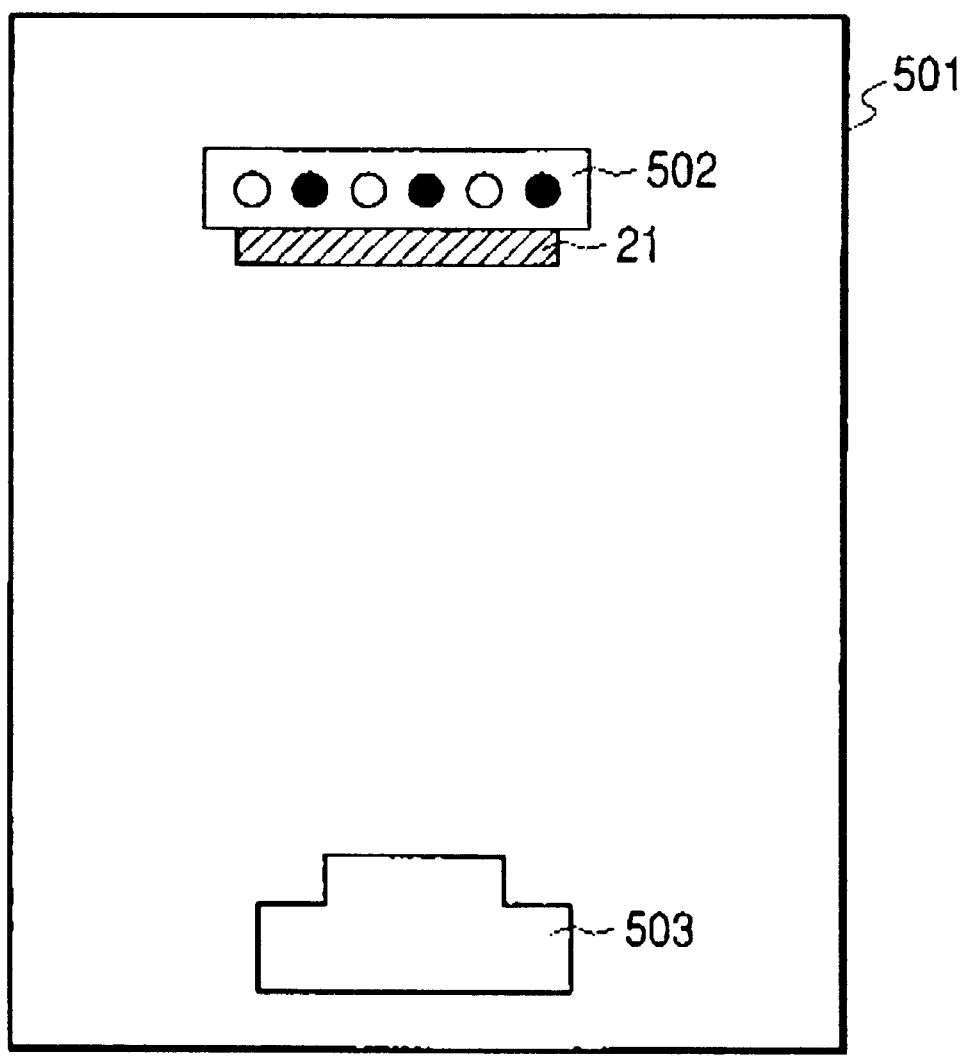
FIG. 6 is a schematic drawing for explaining vapor deposition.

FIG. 6 shows constitution of a vacuum vapor deposition apparatus. The apparatus comprises belljar 501 which is a vacuum vessel; substratum holder 502 for holding a substratum having a cavity as shown in FIGS. 5B and 5E; and boat 503 for holding powdery CsI. In substratum holder 502, a tubing for flowing cooling water or liquid nitrogen and heater for maintaining constant temperature of the held substratum are provided.

For vapor deposition of CsI in cavity 2 of the substratum by the vacuum vapor deposition apparatus shown in FIG. 6, X-ray visible-light transducing substratum 21 having the cavity (FIGS. 5B and 5E) is held by substratum holder 502 with the cavity directed downward (the cavity directed to the vapor deposition source). Substratum holder 502 is heated and kept at a prescribed temperature. Belljar 501 is evacuated by a vacuum pump not shown in the drawing. Boat 503 is heated under a vacuum to vapor-deposit CsI from boat 503 into the cavity 2 of X-ray visible-light transducing substratum 21 in a thickness of 300 $\mu$m.

The diameter (in vapor deposition direction) of columnar crystalline CsI which forms X-ray visible-light transducing layer 22 depends on the substratum temperature. Therefore, the substratum temperature, the pressure in the chamber, and the heating temperature of the boat are suitably selected to obtain a X-ray visible-light transducing layer capable of realizing a desired sensitivity and resolution. In this embodiment, for example, the substratum temperature is 150° C., and the pressure in the chamber is $1 \times 10^{-2}$ Pa. Thereby, the columnar crystal diameter becomes 10 $\mu$m.

The formed X-ray visible-light transducing layer 22 contains $Tl^+$ (thallium ion), $Na^+$ (sodium ion), $K^+$(potassium ion), or the like in a suitable concentration for higher light emission efficiency, higher transduction efficiency of photoelectric transducer to be bonded later, and adjustment of emitting wavelength corresponding to the characteristics of the photoelectric transducing element portion 120.

The portion other than cavity 2 of the vapor deposition face of X-ray visible-light transducing substratum 21 is masked before setting to substratum holder 502 to prevent CsI deposition on the portion other than cavity 2.

X-ray visible-light transducer 20 prepared by the above process is placed such that X-ray visible-ray transducing layer 22 faces element formation region 110 of photoelectric transducer 100 prepared by a separate process. The both are bonded together by adhesive 300 such as an epoxy resin to be fixed relatively to each other. Thus, a radiation image pickup device as shown in FIGS. 3A and 3B can be produced.

In the radiation image pickup device of this embodiment, X-ray is introduced from the X-ray visible-light transducing substratum 21 side of X-ray visible-light transducer 20, and is transduced to visible light by visible-light transducing layer 22. The visible light is introduced to photoelectric transducing element portion 120 formed on base plate 101 of photoelectric transducer 100, and is transduced into electric signals. The electric signals are read by TFT element portion 130 of photoelectric transducer 100 and an external driving circuit not shown in the drawing, and is inputted to an image-processing apparatus and so forth (not shown in the drawing). The image-processing apparatus forms two-dimensional X-ray image from the inputted electric signals.

A water permeability of the base board 201 in FIGS. 1A and 1B measured in a manner provided by JIS Z 0208-73, which board is composed of PET (poly (ethyleneterephthalate)) and used as an X-ray visible-light transducing substratum in such a conventional X-ray visible-light transducer as explained in the above Related Background Art section, is 7 g/m$^2$·24 h/0.1 mm. On the other hand, we have explained aluminum, which has a water permeability of one-hundredth as large as the value of PET or less, as an example of a material for the X-ray visible-light transducing substratum of the present invention in above. If any material having a water permeability of a half of the value of PET, i.e. 3.5 g/m$^2$·24 h/0.1 mm (JIS Z 0208-73) is used in an embodiment, such an embodiment will give the same effect as this embodiment gives. However, the metal material is not limited thereto, and another metal such as titanium may be used, provided that the material transmits the radiation ray sufficiently.

Embodiment 2

Another embodiment of the radiation image pickup device of the present invention is explained by reference to drawings. FIGS. 7A, 7B, 8 and 9A to 9F are drawings for explaining the radiation image pickup device of this embodiment. The same reference numbers and symbols as in Embodiment 1 are used to indicate the corresponding members.

Figure 7A:
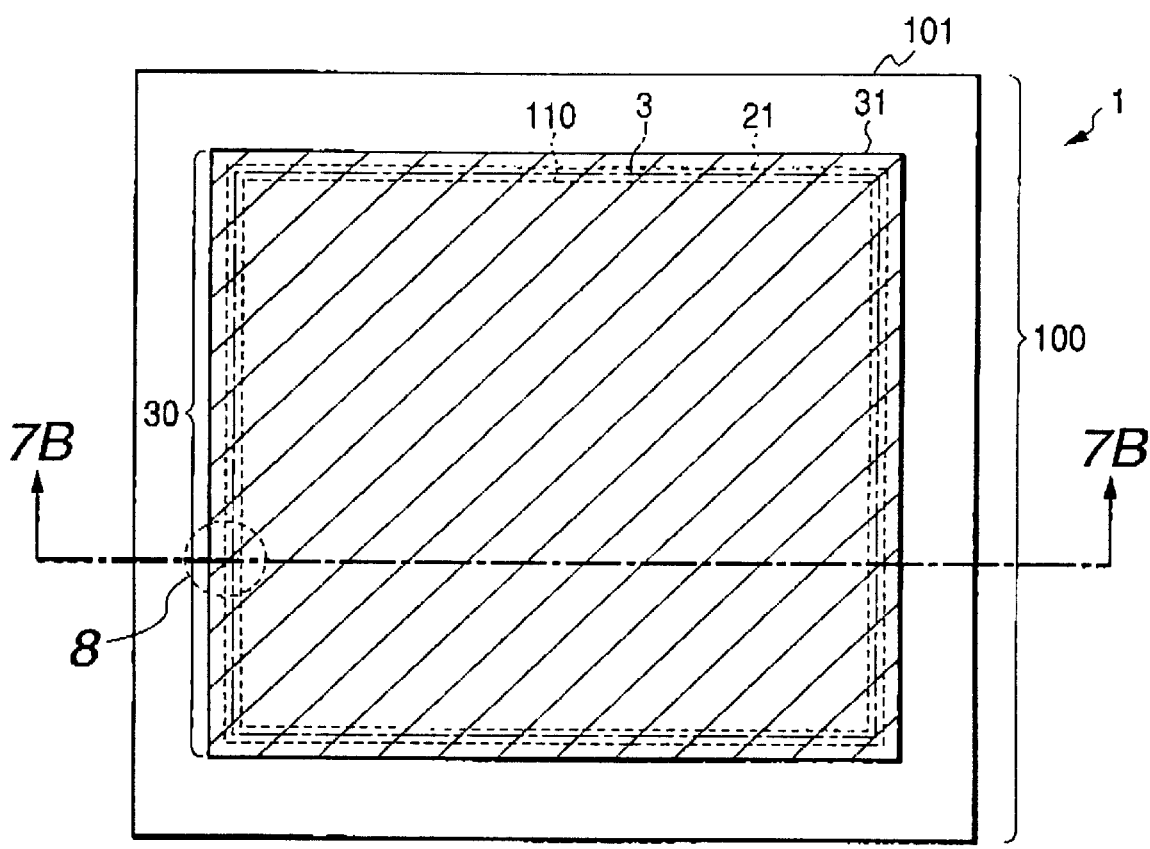
Figure 7B:
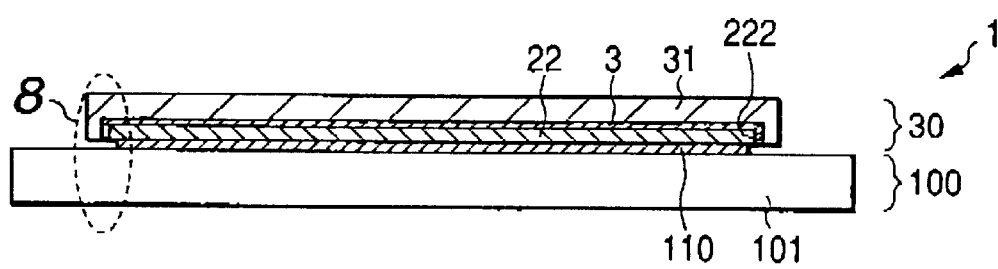

FIG. 7A is a schematic plan view of the radiation image pickup device of this embodiment. FIG. 7B is a schematic sectional view of the device taken along line 7B—7B in FIG. 7A. In FIGS. 7A and 7B, X-ray visible-light transducer 30 comprises X-ray visible-light transducing substratum 31 made of a resin such as PC (polycarbonate) having hollow 222, and metal film 3 of aluminum or the like and X-ray visible-light transducing layer 22 of CsI or the like formed in hollow 222.

Figure 8:
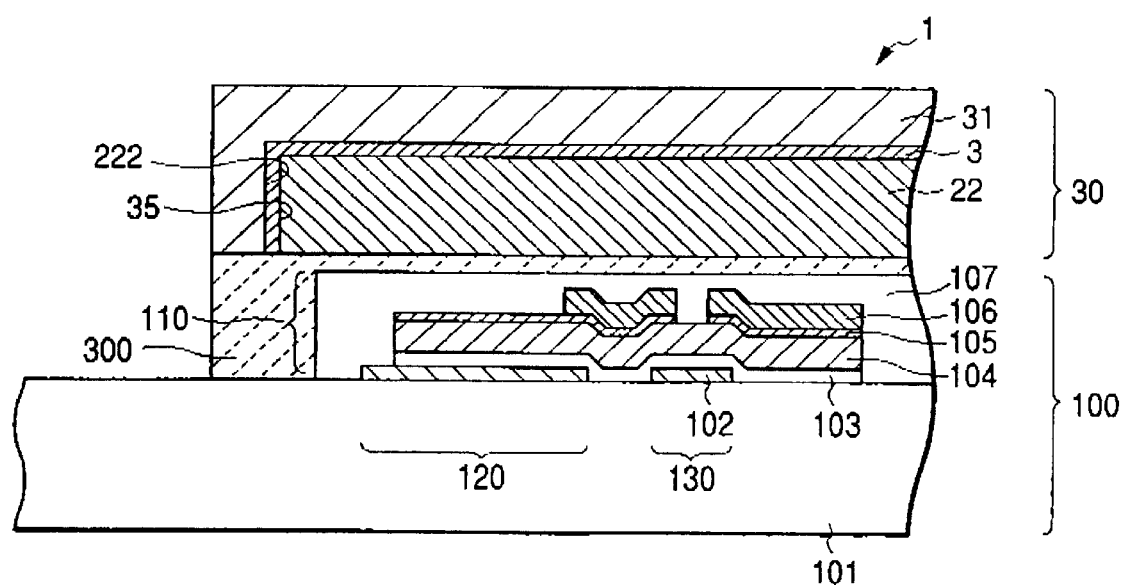

FIG. 8 is an enlarged schematic sectional view of the portion indicated by the closed broken line in FIG. 7B. Since aluminum metallic film 3 lies between X-ray visible-light transducing layer 22 and X-ray visible-light transducing substratum 31 in hollow 222 of X-ray visible-light transducing substratum 31, X-ray visible-light transducing layer 22 is covered with the metal film 3 except the face contacting with adhesive 300. Metallic film 3 prevents penetration of moisture into X-ray visible-light transducing layer 22.

Figure 9A:
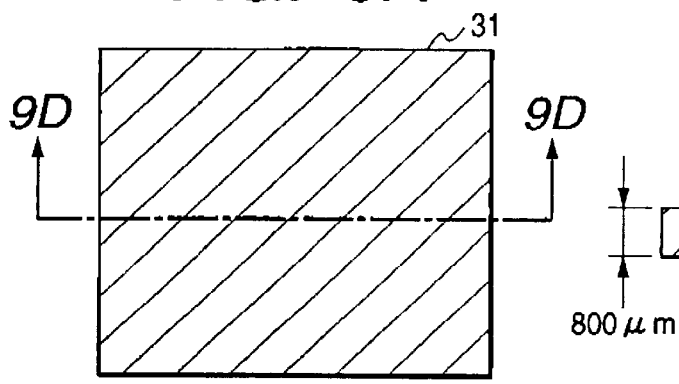
Figure 9D:
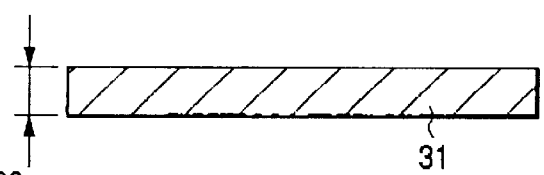
Figure 9B:
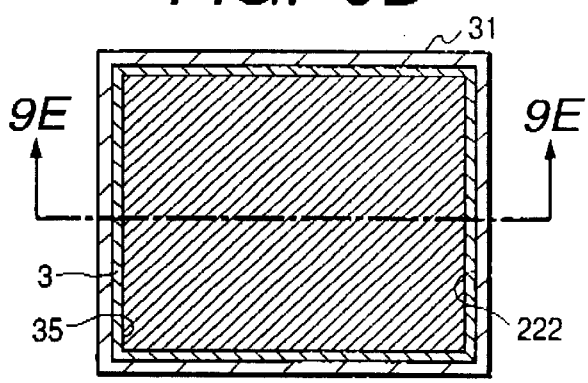
Figure 9E:
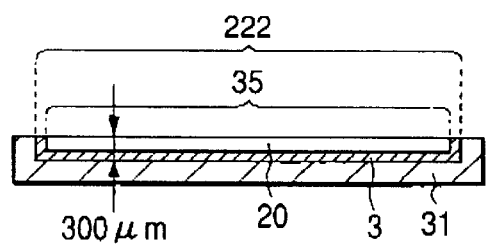
Figure 9C:
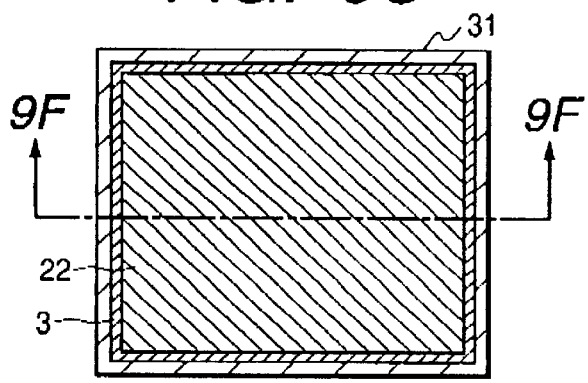
Figure 9F:
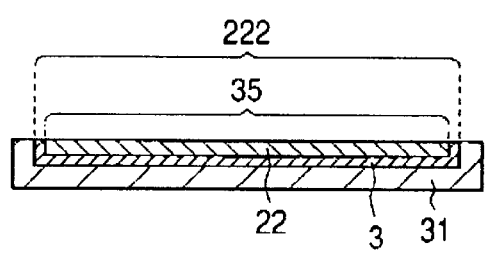

FIGS. 9A to 9F are drawings for explaining the process for producing the X-ray visible-light transducer of this embodiment. FIGS. 9A to 9C are schematic plan views of the X-ray visible-light transducer in the production steps. FIGS. 9D to 9F are schematic sectional views respectively taken along lines 9D—9D, 9E—9E, and 9F—9F in FIGS. 9A to 9C. In FIGS. 9A to 9F, the same reference numbers and symbols as in FIGS. 7A, 7B, and 8 are used to indicate the corresponding members.

In FIGS. 9A to 9D, for forming X-ray visible-light transducer substratum 31, for example, a PC resin (polycarbonate) material of 800 μm thick is prepared. On this material, hollow 222 is formed by press working or cutting as shown in FIGS. 9B and 9E to form X-ray visible-light transducer substratum 31. The distance between the bottom face of the hollow 222 and the surface of the substratum, namely the depth of the hollow, is 300 μm in this embodiment. On hollow 222, metal film 3 is deposited by vapor deposition or a like process in a thickness of 1 μm or more throughout the entire hollow to form cavity 35. This thickness is sufficient to prevent penetration of moisture from the PC to the X-ray visible-light transducing layer and to allow transmission of the radiation (X-ray). Subsequently, as shown in FIGS. 9C and 9F, columnar crystalline CsI as X-ray visible-light transducer layer 22 is deposited on cavity 35 of metal film 3 by vapor deposition by means of a vacuum vapor deposition apparatus (FIG. 6) described above. In this embodiment, CsI Is vapor-deposited in a columnar crystal state of 4 μm diameter on metal face of metal film 3 to fill cavity 35, for example, at a substratum temperature of 100° C. at a pressure in the chamber of 1×10$^{-2}$ Pa by heating boat 503.

The formed X-ray visible-light transducing layer 22 contains Tl$^+$ (thallium ion), Na$^{30}$ (sodium ion), K$^+$(potassium ion), or the like in a suitable concentration similarly as in Embodiment 1. The portion other than cavity 35 of the vapor deposition face regarding X-ray visible-light transducing substratum 31 is masked before setting to substratum holder 502 to prevent CsI deposition on the portion other than cavity 35.

X-ray visible-light transducer 30 prepared by the above process is placed such that X-ray visible-light transducing layer 22 faces element formation region 110 of photoelectric transducer 100 prepared by a separate process. The both are bonded together by adhesive 300 such as an epoxy resin to be fixed relatively to each other. Thus, a radiation image pickup device as shown in FIGS. 7A and 7B Is produced.

In the radiation image pickup device of this embodiment, X-ray is introduced from the side of X-ray visible-light transducing substratum 31 of X-ray visible-light transducer 30, and is transduced to visible light by visible-light transducing layer 22. The visible light is introduced to photoelectric transducing element portion 120 formed on base plate 101 of photoelectric transducer 100, and is transduced into electric signals. The electric signals are read by TFT element portion 130 of photoelectric transducer 100 and an external driving circuit not shown in the drawing, and is inputted to an image-processing apparatus (not shown in the drawing). The image-processing apparatus forms two-dimensional radiograph from the inputted electric signals.

In this embodiment, aluminum is used as the material of metal film 3. However, the material is not limited thereto, and another metal such as chromium may be used, provided that the material transmits the radiation ray in a necessary amount and prevent penetration of moisture.

In this embodiment, metal film 3 is formed only in hollow 222 of the X-ray visible-light transducing substratum. However, formation of the metal film is not limited thereto. The metal film may be formed on the entire surface of X-ray visible-light transducing substratum 31 having hollow 222.

In Embodiments 1 and 2, the X-ray visible-light substratum is in a flat plate shape. However, its shape is not limited to a flat plate, but may be in any shape suitable for and convenient to the use and the design. The object of transduction of the X-ray is not limited to visible light, but may be a light of a wavelength detectable by photoelectric transducing element.

Embodiment 3

Figure 10A:
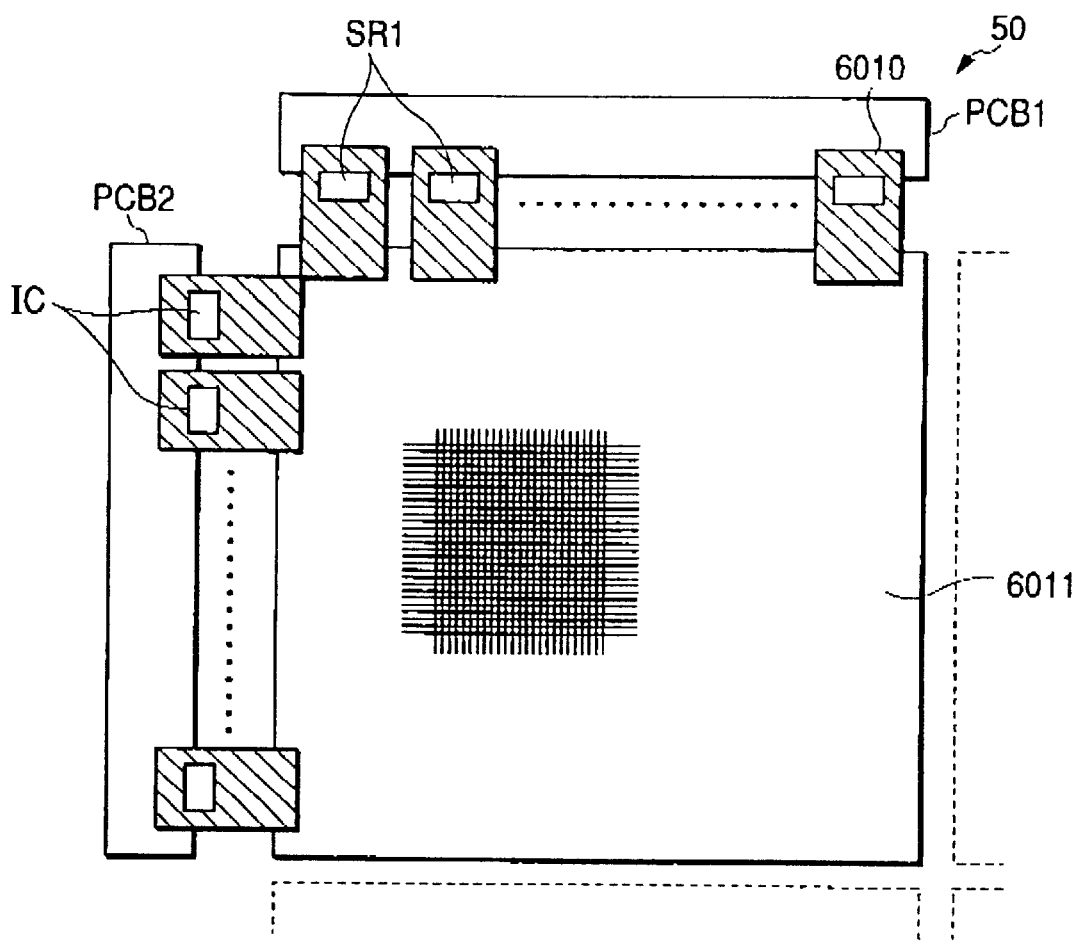
FIG. 10A is a schematic plan view for illustrating arrangement of sensor base plates.
Figure 10B:
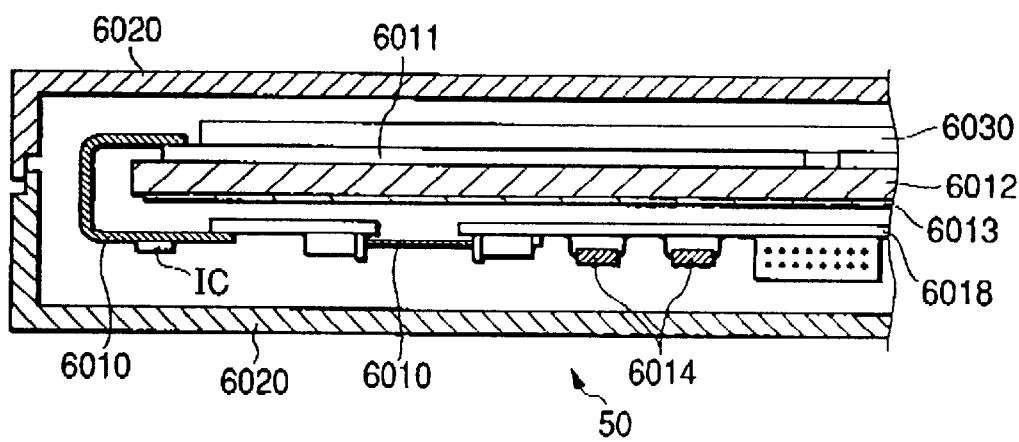
FIG. 10B is a schematic sectional view of the radiation image pickup device.

FIG. 10A is a schematic plan view of photoelectric transducing device section 50 of an X-ray image pickup device having a signal processing circuit. FIG. 10B is a schematic sectional view of the X-ray image pickup device.

Firstly, construction of the X-ray image pickup device is described. Plural photoelectric transducing elements and plural transistors are provided on sensor base plate 6011. Flexible circuit base plates 6010 equipped with shift register SRI and detecting integrated circuits IC respectively are connected to the sensor base plate. The reverse sides of flexible circuit base plates 6010 are connected to circuit base plate PCB1 or PCB2. Plural sensor base plates 6011 are bonded to a base board 6012. On the lower face of base board 6012 comprised in a large photoelectric transducing device, lead sheet 6013 is placed to protect memory 6014 on processing circuit board 6018 against X-ray.

On the sensor base plate 6011, radiation light transducer 6030 containing phosphor such as CsI, which corresponds to the wavelength transducing means in the radiation light transducer of the present invention, is bonded to transduce X-ray to visible light. X-ray is detected by the photoelectric transducer. In this embodiment, the entire of the device is housed in case 6020 made of carbon fiber as shown in FIG. 10B. The one radiation light transducer for plural sensor base plate 6011 as shown in FIG. 10B simplifies the production of the entire device.

Figure 11:
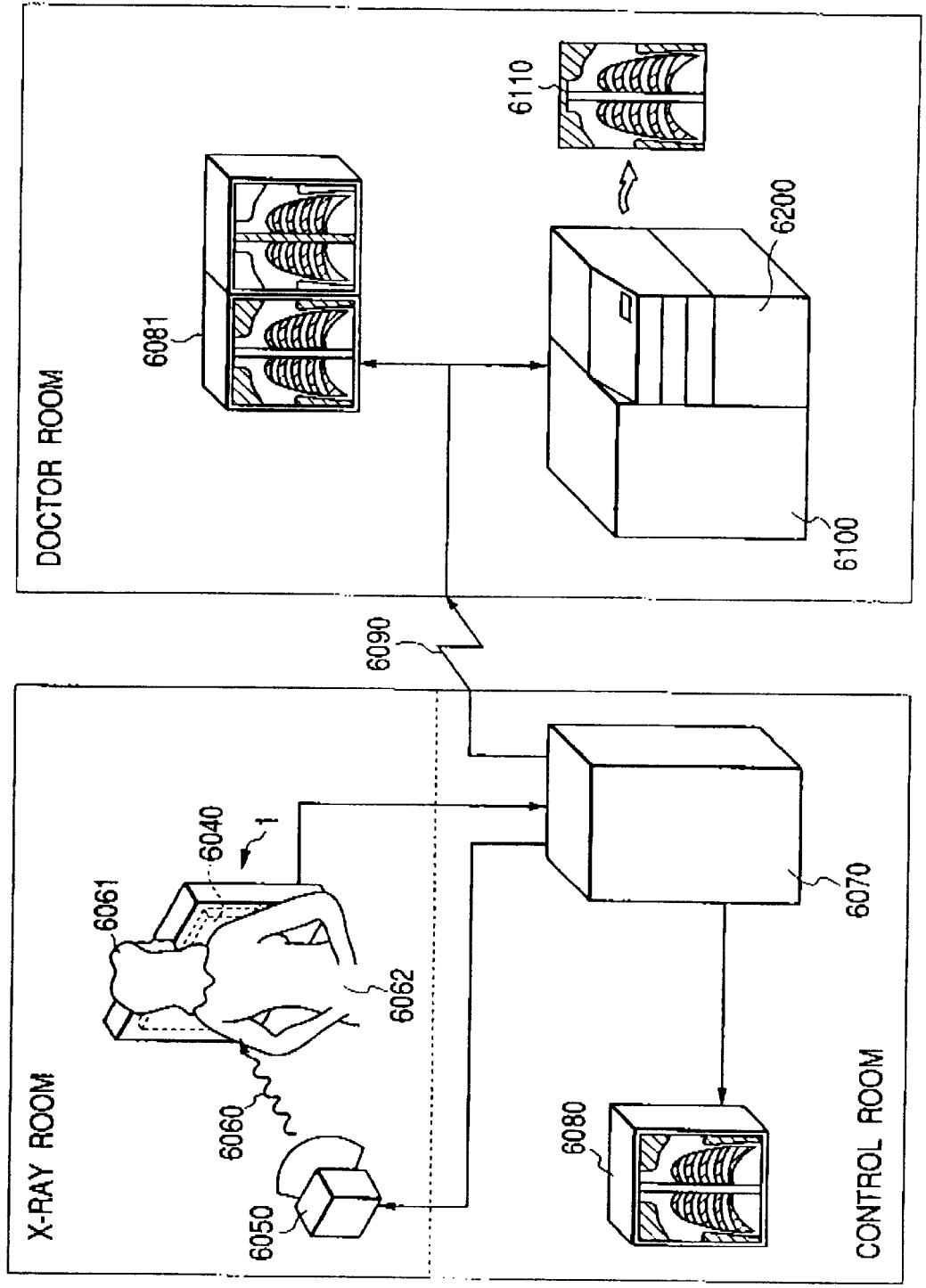
FIG. 11 is a drawing showing a constitution of X-ray diagnosis system employing the radiation image pickup device of the present invention.

FIG. 11 illustrates an X-ray diagnosis system of this embodiment. X-ray 6060 emitted from X-ray tube 6050, which is the irradiating means for projecting X-ray, is allowed to penetrate through chest portion 6062 of patient (or subject) 6061 to reach photoelectric transducer 6040 having the phosphor thereon. The introduced X-ray contains information on the interior of the body of patient 6061. The phosphor emits light corresponding to the incident X-ray, and the emitted light is photoelectrically transduced to electric information.

This information is processed by a signal processing circuit into digital signal, and is processed into image by image processor 6070 to be observable with display 6080 in a control room.

This information can be transmitted by transmitting means such as a telephone line 6090 to a remote place. Thereby, the information can be observed by display 6081 in a separate doctor room, or can be stored or recorded in storing means 6100 such as an optical disk, or film 6110 with the aid of film processor, enabling diagnosis by a doctor at a remote place. In FIG. 11, the numeral 6200 indicates a laser printer.

This embodiment relates to application of the radiation image pickup device to an X-ray diagnosis system, but the radiation image pickup device is applicable also to other radiation image pickup systems such as nondestructive inspection employing radiation ray other than X-ray, such as α-ray, β-ray, and γ-ray.

As described above, in the present invention, one face side of the transducing means for transducing radiation to light is covered by a substratum comprised of a water-nonpermeable member, which prevents penetration of moisture through the substratum into the photoelectric transducing device without increase of the steps of the device production, and retards deterioration of phosphor as the wavelength converter, and facilitates maintenance of the apparatus and the system to reduce the running cost of the apparatus and the system.

What is claimed is:

1. A radiation light transducer comprising a substrate which transmits radiation projected from outside, and a wavelength transducing means formed on a surface of the substrate which transduces the radiation transmitted through the substrate to light, wherein the substrate comprises a water-impermeable member and has a cavity to cover an edge face of the wavelength transducing means.

2. The radiation light transducer according to claim 1, wherein the substrate is comprised of a metal or a resin.

3. The radiation light transducer according to claim 1, wherein the wavelength transducing means comprises cesium iodide.

4. A radiation image pickup device comprising the radiation light transducer set forth in claim 1, and a photoelectric transducer for transducing the transduced light further to electric signals.

5. The radiation image pickup device according to claim 4, wherein the photoelectric transducer comprises a sensor base plate having plural photoelectric transducing elements, and wherein the photoelectric transducer is bonded with an adhesive to a surface of the wavelength transducing means.

6. A radiation image pickup system comprising the radiation image pickup device set forth in claim 4, an irradiating means for projecting radiation to the radiation image pickup device, a signal processing circuit for processing the signals from the photoelectric transducer, a storing means for storing signals from the signal processing circuit, a displaying means for displaying the signals from the signal processing circuit, and a transmission-treatment means for transmitting the signals from the signal processing circuit.

7. A radiation light transducer comprising:
a substrate which transmits radiation and which has a cavity on one face thereof, the substrate comprising a water-impermeable member; and
a wavelength transducing means formed on a surface of the substrate for transducing a wavelength of the radiation, wherein the wavelength transducing means is formed in the cavity of the substrate so that the wavelength transducing means is in contact, at one face and an adjacent edge face thereof, with an inside face of the cavity of the substrate.

8. The radiation light transducer according to claim 7, wherein the water-impermeable member is a metal film, and the wavelength transducing means is formed on a surface of the metal film.

9. The radiation light transducer according to claim 7 or 8, wherein the wavelength transducing means contains cesium iodide.

10. The radiation light transducer according to claim 9, the cesium iodide contains columnar crystals thereof.

11. A radiation image pickup device comprising the radiation light transducer set forth in claim 10, and a photoelectric transducer for transducing the light transduced by the radiation light transducer further to electric signals.

12. The radiation image pickup device according to claim 11, wherein the photoelectric transducer comprises a sensor base plate having plural photoelectric transducing elements.

13. The radiation image pickup device according to claim 12, wherein the radiation light transducer is connected to the photoelectric transducing elements.

14. A radiation image pickup system comprising the radiation image pickup device set forth in claim 1, an irradiating means for projecting radiation to the radiation image pickup device, a signal processing circuit for processing the signals from the photoelectric transducer, a storing means for storing signals from the signal processing circuit, a displaying means for displaying the signals from the signal processing circuit, and a transmission-treatment means for transmitting the signals from the signal processing circuit.

15. A radiation image pickup device comprising the radiation light transducer set forth in claim 9, and a photoelectric transducer for transducing the light transduced by the radiation light transducer further to electric signals.

16. The radiation image pickup device according to claim 15, wherein the photoelectric transducer comprises a sensor base plate having plural photoelectric transducing elements.

17. The radiation image pickup device according to claim 16, wherein the radiation light transducer is connected to the photoelectric transducing elements.

18. A radiation image pickup system comprising the radiation image pickup device set forth in claim 15, an irradiating means for projecting radiation to the radiation image pickup device, a signal processing circuit for processing the signals from the photoelectric transducer, a storing means for storing signals from the signal processing circuit, a displaying means for displaying the signals from the signal processing circuit, and a transmission-treatment means for transmitting the signals from the signal processing circuit.

19. The radiation light transducer according to claim 8, wherein the metal film is formed on a substratum comprised of a resin, and the substratum has a hollow.

20. A radiation image pickup device comprising the radiation light transducer set forth in any of claims 7, 8 and 19 and a photoelectric transducer for transducing the light transduced by the radiation light transducer further to electric signals.

21. The radiation image pickup device according to claim 20, wherein the photoelectric transducer comprises a sensor base plate having plural photoelectric transducing elements.

22. The radiation image pickup device according to claim 21, wherein the radiation light transducer is connected to the photoelectric transducing elements.

23. A radiation image pickup system comprising the radiation image pickup device set forth in claim 20, an irradiating means for projecting radiation to the radiation image pickup device, a signal processing circuit for processing the signals from the photoelectric transducer, a storing means for storing signals from the signal processing circuit, a displaying means for displaying the signals from the signal processing circuit, and a transmission-treatment means for transmitting the signals from the signal processing circuit.

\* \* \* \* \*

UNITED STATES PATENT AND TRADEMARK OFFICE
CERTIFICATE OF CORRECTION

PATENT NO.   : 6,624,421 B1
DATED        : September 23, 2003
INVENTOR(S)  : Shinichi Takeda It is certified that error appears in the above-identified patent and that said Letters Patent is hereby corrected as shown below:

Title page,
Item [57], ABSTRACT,
Line 9, "prevented" should read -- prevented. --.

Column 1,
Line 11, "Into" should read -- into --; and
Line 38, "are" should read -- is --.

Column 2,
Line 2, "a" should be deleted;
Line 11, "FIG. 15." should read -- FIG. 1B. --;
Line 24, "portion 120;" should read -- portion 120, --; and
Line 63, "This" should read -- These --.

Column 3,
Line 31, "of" should be deleted; and
Line 48, "In" should read -- in --.

Column 6,
Line 1, "snown" should read -- shown --; and
Line 30, "a" should read -- an --.

Column 8,
Line 2, "Subsequently" should read -- ¶Subsequently --;
Line 7, "Is" should read -- is --;
Line 13, "$Na^{30}$" should read -- $Na^{+}$ --; and
Line 26, "Is" should read -- is --.

Column 9,
Line 1, "SRI" should read -- SR1 --.

UNITED STATES PATENT AND TRADEMARK OFFICE
CERTIFICATE OF CORRECTION

PATENT NO. : 6,624,421 B1
DATED : September 23, 2003
INVENTOR(S) : Shinichi Takeda It is certified that error appears in the above-identified patent and that said Letters Patent is hereby corrected as shown below:

<u>Column 10,</u>
Line 40, "the" should read -- wherein the --; and
Line 52, "claim 1" should read -- claim 11 --.

Signed and Sealed this

Sixteenth Day of March, 2004

JON W. DUDAS
*Acting Director of the United States Patent and Trademark Office*